UNITED STATES PATENT OFFICE.

LEO WEBER, OF DARMSTADT, GERMANY.

PROCESS OF MAKING GUANIN.

No. 799,955.      Specification of Letters Patent.      Patented Sept. 19, 1905.

Application filed July 6, 1905. Serial No. 268,548.

*To all whom it may concern:*

Be it known that I, LEO WEBER, doctor of philosophy, and a subject of the Grand Duke of Baden, in the Empire of Germany, residing at Darmstadt, Germany, have invented a certain new and useful Improvement in the Production of Guanin, of which the following is a specification.

In my application, Serial No. 223,746, filed September 8, 1904, I have described a process for the obtainment of 2-cyanamido-4-amido-6-oxypyrimidin. It has been discovered that from this product by action of nitrous acid and subsequent reduction in an acid or alkaline solution there can readily be obtained 2-cyanamido-4-5-diamido-6-oxypyrimidin.

My present invention consists in a process of converting 2-cyanamido-4-5-diamido-6-oxypyrimidin directly into guanin by boiling it with formic acid. During this treatment the cyan group splits off and the glyoxalin-ring is formed and closed.

The specific mode of procedure is as follows: Fifty grams of 2-cyanamido-4-5-diamido-6-oxypyrimidin are boiled with six hundred grams of ninety per cent. formic acid for six hours under a reflux condenser. The formic-acid salt of the base crystallizing out at the beginning soon goes into solution, and upon cooling the mass stiffens to a crystalline paste, which consists of guanin formate. The crystals are separated from the mother-liquor and the substance is purified by repeatedly dissolving it in a hot solution of sodium hydrate and precipitating it with acetic acid at boiling heat. The product thus obtained possesses all the properties of guanin, and its formation may theoretically be represented by the equation

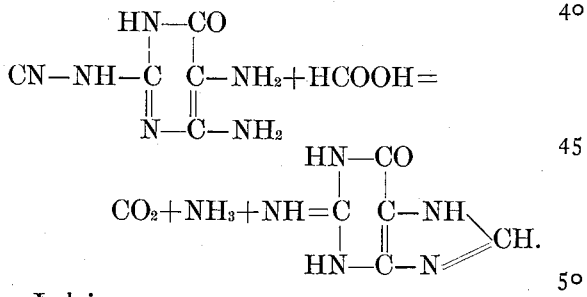

I claim—

The process of producing guanin by heating 2-cyanamido-4-5-diamido-6-oxypyrimidin with formic acid.

LEO WEBER.

Witnesses:
    MATHILDE WEBER,
    WALTER HOUSING.